United States Patent

[11] 3,589,334

| | | |
|---|---|---|
| [72] | Inventor | Stanley T. Athas<br>Lowell, Mass. |
| [21] | Appl. No. | 876,483 |
| [22] | Filed | Nov. 13, 1969 |
| [45] | Patented | June 29, 1971 |
| [73] | Assignee | United Bakery Engineering Corporation<br>Framingham, Mass. |

[54] SEMIAUTOMATIC MACHINE FOR APPLYING LIQUID COATINGS TO PANS
2 Claims, 4 Drawing Figs.

[52] U.S. Cl. .................................................. 118/326,
134/103, 118/DIG. 8
[51] Int. Cl. .................................................. B05c 5/00,
B05c 11/16
[50] Field of Search .......................................... 118/7, 24,
25, 326, Dig. 8; 134/94, 103

[56] References Cited
UNITED STATES PATENTS

| | | | |
|---|---|---|---|
| 3,294,101 | 12/1966 | Suzuki et al. | 134/103 X |
| 3,335,698 | 8/1967 | Hayon | 118/326 X |
| 3,424,125 | 1/1969 | Wiggins | 118/326 X |

*Primary Examiner*—John P. McIntosh
*Attorney*—Joseph Zallen

ABSTRACT: A machine is described for selectively coating a baking pan or baked goods with different liquids, as for example, grease, egg wash and glazing, in a rapid manner without the risk of contamination of one material by the other. The machine comprises a trough supporting a perforated pan support covered by a lateral housing containing a spray head. With one of the liquids recirculation is from the trough to the spray head. For a different liquid an insert is provided on top of the pan support which isolates it from the sidewalls of the housing and a separate container is caused to recirculate the different liquid.

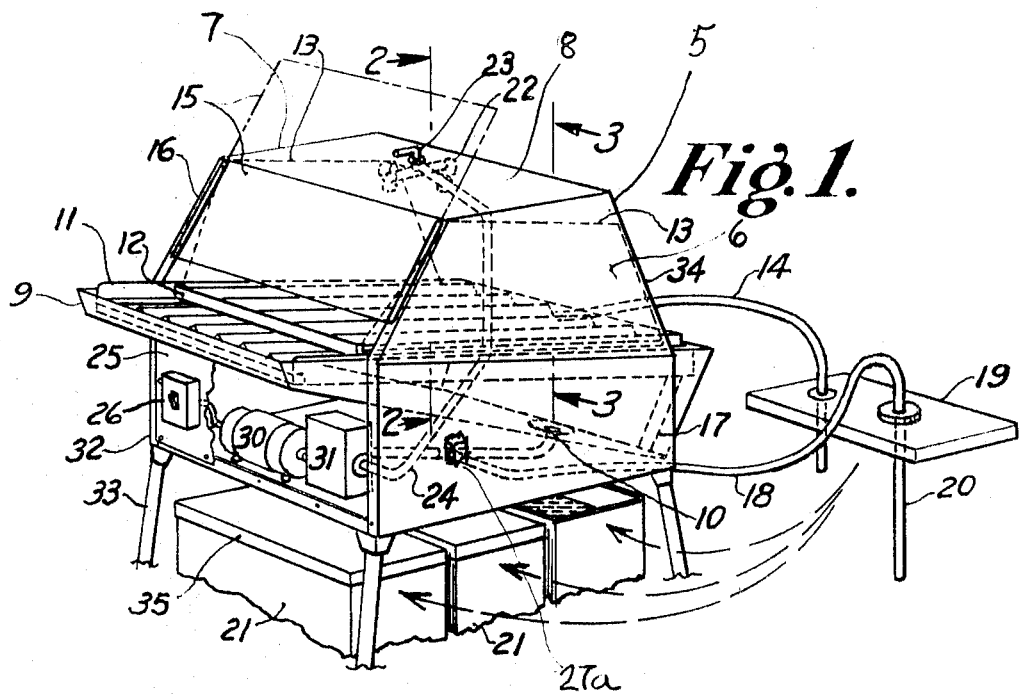
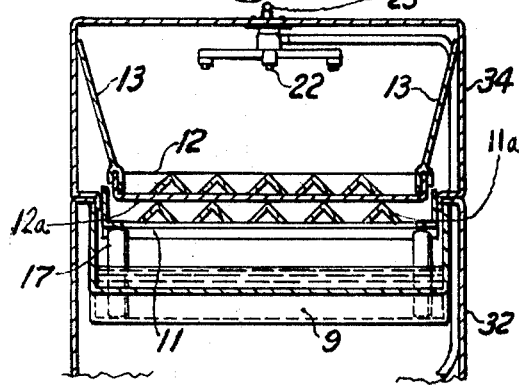
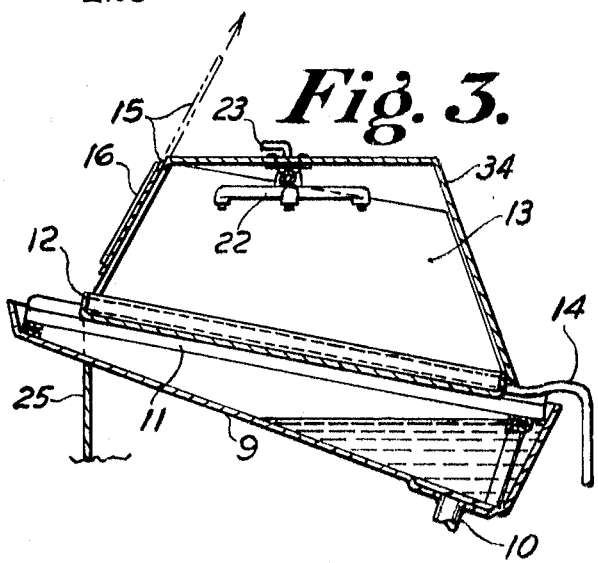
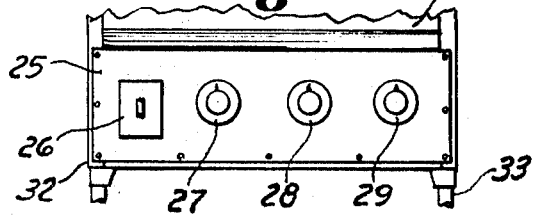

# SEMIAUTOMATIC MACHINE FOR APPLYING LIQUID COATINGS TO PANS

BACKGROUND OF THE INVENTION

This invention relates to liquid applicators and the like and in particular to machines for applying coatings of grease and other liquid materials to a baking pan or baked goods in the pan.

Various devices have been described in the prior art for applying grease to a baking pan and such patents are exemplified in Class 118, Subclass 73. However, such machines as have been previously described are limited in their utility since they require time consuming and tedious cleaning to convert from one material to another. Thus, although bakers are desirous of using a single machine to selectively apply grease, egg wash or glazing, they cannot accomplish this with prior art devices in any rapid convenient manner.

One object of the present invention is to provide a machine for applying liquid coatings such as grease, egg wash and glazing to a baking pan or goods. wherein the change from one material to another can be made very rapidly and easily.

Other objects and advantages of this invention will be apparent from the description and claims which follow, taken together with the appended drawings.

SUMMARY OF INVENTION

The invention comprises generally a machine for selectively applying different liquids to a baking pan or goods, such liquids include, for example, pan grease, egg wash and glazing to be applied as coatings.

Supported by the frame of the machine is an open through supporting a perforated, preferably corrugated, pan support plate and enclosed laterally by a housing having a spray head on top. Where grease is used, the grease is recirculated from the trough to the spray head and onto the pans which are fed in from the front and removed from the back. The overflow or excess grease flows through the perforations and back into the trough.

Where a different liquid coating is desired, as for example, egg wash, a separate container is provided which is also connected to the spray head. However, in this case an insert is provided which sits on top of the pan support member, has a solid bottom and is provided with side deflectors. The egg wash now flowing from the same spray head can coat goods but its excess will now not touch the walls of the housing nor flow through to the trough but instead is recirculated through a separate conduit. Also, any grease on the walls of the housing will not contaminate or drip onto the goods to which the egg wash is being applied. In a similar manner, additional containers and additional inserts can be used to provide other liquids, as for example, glazing. A preferred feature of this invention is a control which permits the switching from one liquid to another.

The entire operation of inserting or removing an insert and manipulating the desired controls is very rapid, usually requiring less than a minute.

BRIEF DESCRIPTION OF DRAWINGS

FIG. 1 is a perspective view with partial cutaway of one embodiment of this invention.
FIG. 2 is a transverse section along line 2-2 of FIG. 1.
FIG. 3 is a longitudinal section along line 3-3 of FIG. 1.
FIG. 4 is a partial front view showing the outside lower panel which has been removed in FIG. 1.

SPECIFIC EXAMPLE OF INVENTION

Referring now to the drawings, there is illustrated therein a machine which can be used to selectively apply different liquids such as grease, egg wash or glazing to a baking pan or its goods. It is semiautomatic in operation in that a pan is fed from the front of the machine by an operator and slides out the rear onto a collecting table or belt (not illustrated).

The device in its basic form comprises a frame 16 which supports a trough 9. A pan support 11 having rear legs 17 is inserted in the trough 9. Support 11 comprises a sheet which is longitudinally corrugated and perforated. Trough 9 constitutes the reservoir for pan grease and has a suction line 10 which carries the grease to the input side of pump 31 and permits it to be pumped out through output line 24 to a spray head 22 provided with a valve 23 permitting the desired intensity of spray. The volume in which the spray head 22 and pan support 11 are located is enclosed by a housing 5 which includes sidewalls 6 and 7, front cover panel 15 and rear cover panel 34, as well as top wall 8. The illustrated insert member 12 with its side deflector plates 13 is taken out of the machine when the grease is being used. Accordingly, the pan to be greased is fed onto the top 11a of the corrugations of the pan support member 11 from the front, the cover 15 being sufficiently open to permit such insertion. Power is turned on at switch 26 which actuates the motor 30 driving pump 31. Selector switch 27 mounted on front panel 25 does, by means not illustrated, actuate selector valve 27a so as to select the grease from line 10 as being the input for the pump 31. Selector valve 23 is adjusted for the desired intensity with the result that there is constant spraying of grease from spray head 22 through the perforations in corrugated support member 11 into the trough 9 and then out again through suction line 10 to the pump for recirculation. A braking pan fed into the machine will thus be coated as it passes through on the incline with any overflow coming through the perforations into the trough 9. The perforations are so made as to filter out or withhold bread crumbs or the like but to permit flow of the grease.

When it is desired to change from grease to another liquid, as for example, glazing or egg wash, an insert 12 is slid on top of support member 11. Insert 12 comprises a pan with a solid bottom wall 12a but with similar longitudinal perforated corrugations as in support 11. A deflector plate 13 is slid onto each sidewall of insert 12 so as to form an inner chamber substantially completely isolated from support 11 and the sidewalls 6 and 7 which are typically caked with grease during a greasing operation.

Before the insert 12 with its deflector plates 13 has been placed in position, selector 27 is moved so as to cut off the flow of grease form suction lines 10 and allow a new suction line 18 to be connected to the pump 31. Suction line 18 extends through the cover 19 of a container 21 having a different liquid, as for example egg wash. The egg wash will now be subject to being sucked up though pipe 20 to the pump and thence out through line 24 to the spray head 22. As a preliminary matter, the egg wash can be used to purge the pump and line in a matter of a few seconds. Then any pans said onto the corrugations of insert 12 will now be sprayed with the egg wash. The excess egg wash is collected by overflow line 14 which returns the material to the container 21.

In a similar manner, another insert 12 with deflector plates 13 can be substituted where it is desired to use another liquid material in a similar container 21, following a similar procedure. Usually less than a minute is required to insert or substitute the insert member 12 with the deflector plates 13 and accomplish the purging which may be desired.

It should be noted that FIG. 1 is partially schematic in that it shows only one container 21 connected to the selector valve 27a. In practice, a multiple position valve could be used whereby all containers 21 would be linked to valve 27a and thus be immediately available for suction into the spray system.

In addition to the selector switch 27 mounted on panel 25, another switch 28 is provided to control the output flow from the pump 31 and a valve 29 is provided for control of optional flexible gun spray lines which might be attached.

In the drawings, valve selector 27 and valve 27a are shown as two separate entities. However, it is preferred that they be housed together, as for example, on the panel 25 so that the mechanical linkage of the selector switch 27 to the valve 27a will not be longer than necessary.

I claim:

1. A machine for selectively applying different liquids to a baking pan or the like, comprising a frame, a trough (9) supported by said frame, a pan support member (11) comprising a perforated corrugated place, a housing (5) defining a laterally closed volume with said support member (11) and adapted to receive a removable insert member (12), a spray head (22) mounted in said housing (5), means for causing liquid in said trough (9) to move to said spray head (22), at least one separate container (21) for a different liquid, means for causing said different liquid to flow to said spray head (22), and means to permit flow of said different liquid from said insert (12) to said container 21; said pan support member (11) being characterized in that liquid applied to it will flow through to said trough (9); said removable insert member (12) being provided with a solid bottom wall and side deflectors (13) so as to isolate the flow of said different liquid from said spray head (22) from the sidewalls of the housing (5).

2. The machine of claim 1 wherein control means are provided to switch the flow to the spray head (22) from one liquid to another.